United States Patent
Fellows et al.

[11] Patent Number: 5,895,337
[45] Date of Patent: Apr. 20, 1999

[54] CONTINUOUSLY-VARIABLE-RATIOS TRANSMISSIONS

[75] Inventors: Thomas George Fellows, Headington; Christopher John Greenwood, Preston, both of United Kingdom

[73] Assignee: Torotrak (Development) Limited, London, United Kingdom

[21] Appl. No.: 08/875,952

[22] PCT Filed: Mar. 15, 1996

[86] PCT No.: PCT/GB96/00621

§ 371 Date: Aug. 8, 1997

§ 102(e) Date: Aug. 8, 1997

[87] PCT Pub. No.: WO96/28668

PCT Pub. Date: Sep. 19, 1996

[30] Foreign Application Priority Data

Mar. 16, 1995 [GB] United Kingdom ............ 9505346

[51] Int. Cl.⁶ ..................................... F16H 15/38
[52] U.S. Cl. ...................... 476/10; 476/40; 476/46
[58] Field of Search ...................... 476/10, 40, 41, 476/46

[56] References Cited

U.S. PATENT DOCUMENTS

| | | | |
|---|---|---|---|
| 2,850,910 | 9/1958 | Kraus | 476/1 |
| 2,850,911 | 9/1958 | Kraus | 476/10 X |
| 3,008,337 | 11/1961 | Kraus | 476/10 |
| 3,087,348 | 4/1963 | Kraus | 476/10 |
| 3,159,042 | 12/1964 | Kraus | 476/10 |
| 3,267,756 | 8/1966 | Perry et al. | 476/40 X |
| 4,086,820 | 5/1978 | Kraus et al. | 476/10 X |
| 4,126,052 | 11/1978 | Jackman | 476/10 |
| 4,275,610 | 6/1981 | Kraus | 476/10 |
| 4,281,559 | 8/1981 | Sharpe | 476/10 |
| 4,434,675 | 3/1984 | Kraus | 476/10 X |
| 4,484,487 | 11/1984 | Kraus | 476/10 X |
| 4,526,051 | 7/1985 | Kraus | 476/10 |
| 5,330,396 | 7/1994 | Lohr et al. | 476/10 |

FOREIGN PATENT DOCUMENTS

| | | |
|---|---|---|
| 1 450 777 | 5/1964 | Germany. |
| A 14 50 777 | 4/1970 | Germany. |
| 281236 | 6/1952 | Switzerland. |
| A 281 236 | 6/1952 | Switzerland. |
| 476589 | 12/1937 | United Kingdom. |
| 673168 | 6/1952 | United Kingdom. |
| 1002479 | 8/1965 | United Kingdom. |
| 2 227 287 | 7/1990 | United Kingdom. |
| WO 96/28668 | 9/1996 | WIPO. |

*Primary Examiner*—Allan D. Herrman
*Attorney, Agent, or Firm*—Davis and Bujold

[57] ABSTRACT

A variator for a continuously-variable-ratio transmission (CVT) of the half-toroidal traction roller type in which a ratio change results when a roller exercises a first freedom of movement by rotating about a first or precession axis. In addition, the roller mounting has a further freedom of movement about a second or tilt axis. The precession axis is inclined at an angle ("the castor angle") to a plane lying normal to the axis of the races and each equilibrium value of the ratio angle correlates with a unique angular orientation of the roller about the tilt axis.

5 Claims, 2 Drawing Sheets

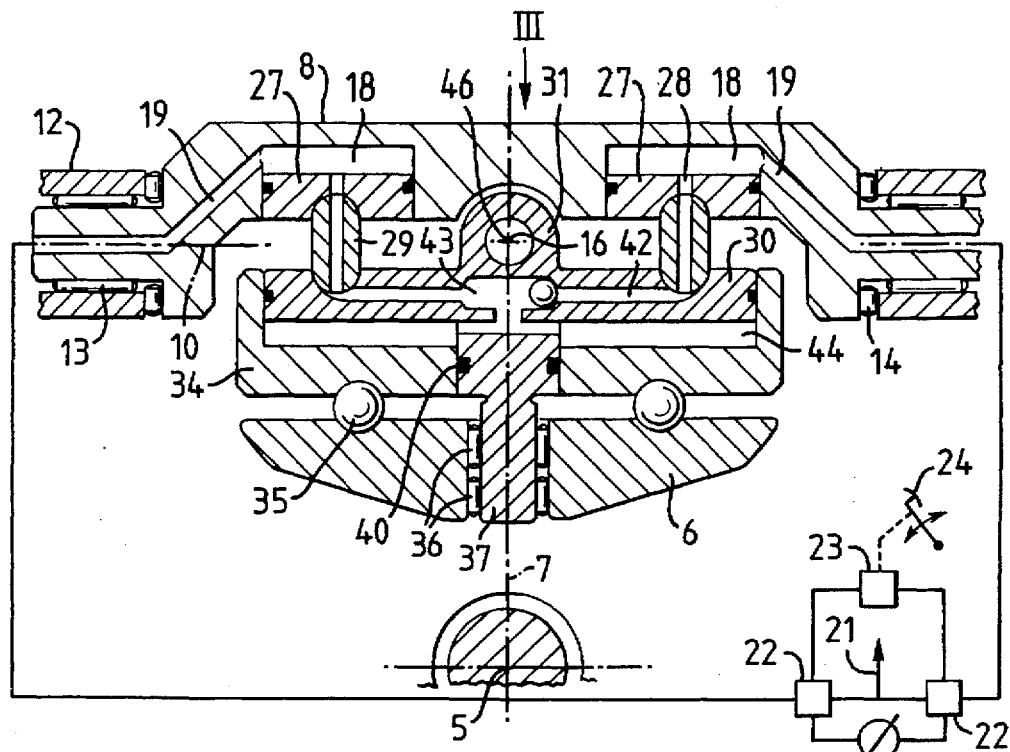
Fig. 1
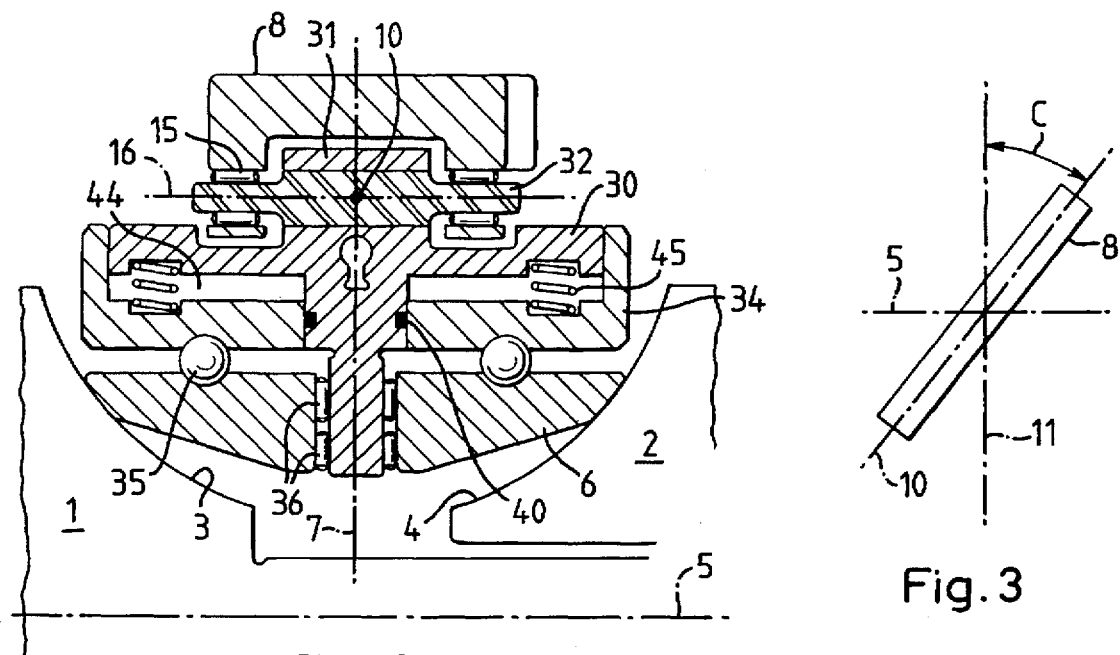
Fig. 2
Fig. 3

CONTINUOUSLY-VARIABLE-RATIOS TRANSMISSIONS

This invention relates to variators—that is to say the ratio-varying mechanisms of the toroidal-race rolling-traction type for continuously-variable-ratio transmissions ("CVTs"), and particularly to variators of the so-called "half-toroidal" type in which the rollers are positioned inwardly of the centre of the cavity defined by the part-toroidal races formed in the input and output discs. This is in contrast to variators of the so-called "full toroidal" type where the rollers span the toroidal cavity substantially diametrically.

BACKGROUND OF THE INVENTION

In known variators of the half-toroidal type it has been customary for the operator to change the transmitted ratio using what has become known in the art as "tangential shift". Each carriage and its associated roller has been mounted to rotate about its so-called precession axis, so changing the radii at which the roller makes contact with the input and output discs, and so changing the transmitted ratio. Each roller and its carriage has also been mounted so that it can be controlled to move bodily along the precession axis in a direction approximately tangential to the centre circle of the torus presented by the two discs. A rotation of a roller about its precession axis, resulting in a change of transmitted ratio, is thus effected by a tangential movement, the result of which is to introduce a steering angle between the roller and the disc at the point of contact so as to steer the roller to a new ratio. It is however well recognised in the art of half-toroidal CVT's that ratio change by tangential shift imposes design problems because of the large outward forces on the roller carriages which must be reacted in bearings permitting both linear and rotary motion with the minimum of friction.

Some alternatives to such tangential shift operation for CVT's of the half-toroidal type have however been proposed. One such proposal is described in U.S. Pat. No. 3,008,337, in which the carriage of each of the rollers—three in number—spanning the toroidal cavity between the input and output discs is mounted to rotate not only about a precession axis as already described, but also about a second or "tilt" axis lying parallel to the common axis of the discs. Ratio change is effected by each roller carriage rotating about its tilt axis, so introducing a steering angle and causing rotation of the carriage about the precession axis.

This geometry makes possible a CVT of the so-called "torque-controlled" type in which the rollers tend to adopt a ratio angle at which the sum of the torques transmitted by the input and output discs matches the control force applied to the means to pivot each roller about its tilt axis. That force, in U.S. Pat. No. 3,008,337, is applied hydraulically.

It is will known in the art of toroidal-race CVT's generally, and half-toroidal designs particularly, that the CVT can be at equilibrium at a particular transmitted ratio only when the axis of rotation of each roller intersects the common axis of the discs. If this condition is not fulfilled, the rollers will have "steering angle" and must therefore be in the course of changing the transmitted ratio to a new value at which intersection is restored. The geometry of U.S. Pat. No. 3,008,337, and in particular the orientation of the precession and tilt axes, is such that equilibrium can only exist when the tilt of each roller about its tilt axis is at a mid position. In other words; any transition of the ratio angle of the rollers from one equilibrium value to another must be initiated by a departure of each roller from its mid tilt position, and can only conclude when that mid tilt position is restored as the new ratio value is attained. There is thus no unique correlation between each equilibrium ratio of the transmission and a particular orientation of each roller about its tilt axis, because every equilibrium ratio value must be accompanied by the same mid-value of tilt. This mode of operation may result in disappointing characteristics of response and especially stability.

SUMMARY OF THE INVENTION

U.S. Pat. No. 3,008,337 discloses all the features in the pre-characterising portion of claim 1.

DE-B-1450777 discloses a full toroidal race rolling traction variator having a precession axis and a tilt axis as defined later herein in which the precession axis is inclined at a castor angle relative to a plane extending transversely to the axis upon which the discs of the variator rotate.

The present invention arises from appreciating the possibility of a different geometry, leading to a tilt-controlled CVT of potentially better response and stability in which each equilibrium ratio angle of each roller correlates with a unique orientation of that roller about its tilt axis.

Accordingly, the present invention provides a half toroidal race rolling traction variator for a continuously-variable-transmission, the variator having a pair of discs mounted for rotation about a variator axis; a roller positioned between said discs for transmitting traction therebetween; a carrier in which said roller is mounted for rotation about a roller axis and for tilting about a tilt axis; and a support member in which said carrier is carried, characterised in that said support member is in turn mounted for rotation about a precession axis inclined at an angle to a plane lying normal to said variator axis, such that a ratio change results when said support member exercises a freedom of movement by rotating about said precession axis and in which an equilibrium condition is reached when each angle of tilt about said tilt axis correlates with an associated unique angle of rotation about said precession axis.

BRIEF DESCRIPTION OF THE DRAWING(S)

The invention will now be described by way of example with reference to the accompanying simplified and diagrammatic drawings in which:

FIG. 1 is an approximately transverse section through an embodiment of the invention;

FIG. 2 is an axial section through the same embodiment,

FIG. 3 shows one component viewed in the direction of arrow III in FIG. 1, and

DESCRIPTION OF THE PREFERRED EMBODIMENT(S)

Figure 4:
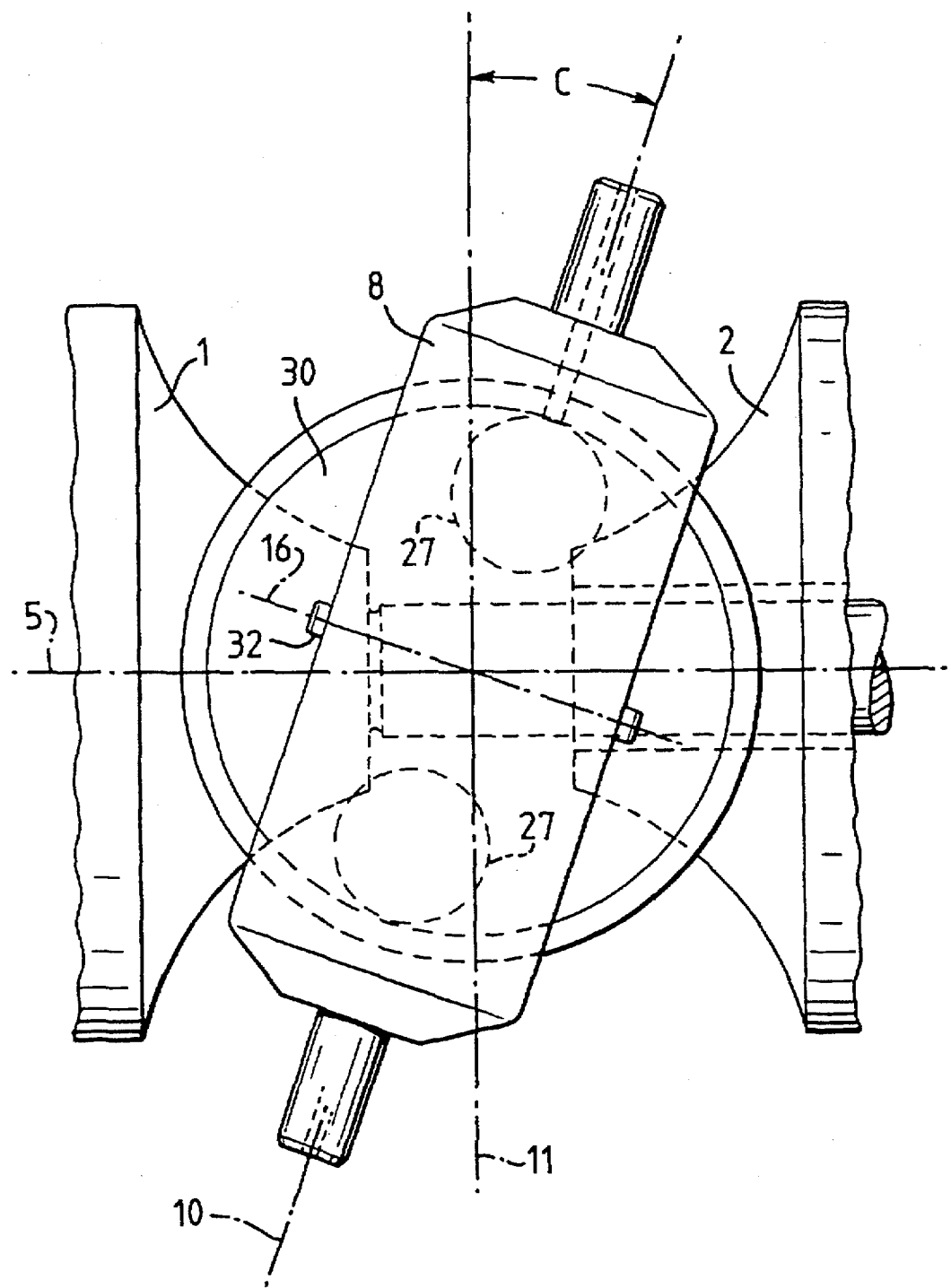
FIG. 4 shows the same component in more detail.

FIG. 2 shows two discs 1, 2 of the variator of a CVT of the half-toroidal rolling-traction type. The discs present part-toroidal races 3 and 4 and are independently rotatable about a common variator axis 5. The rim of a roller 6, mounted in a manner that will be described, runs in contact with races 3 and 4 and transmits traction between them. The roller will in practice be one of a set of two or three, possibly more, spaced at angular intervals from each other around the axis 5. As shown, and as will be the case whenever the variator is in equilibrium at the ratio it is transmitting, the roller axis 7 intersects the variator axis 5. However, as FIG. 3 shows best, the main structural member 8 of the roller carriage which defines the roller precession axis 10 is inclined to the transverse plane 11 at an angle C, which will be referred to as the castor angle.

As FIGS. 1 and 2 show, carriage member 8 is mounted on the fixed structure 12 of the CVT in rotary bearings 13, so as to be free to rotate about the axis 10. Axial movement of member 8 within its mounting is prevented by thrust bearings 14. Rotary bearings 15 carried by member 8 define another axis of rotation 16 (FIG. 2), which is substantially parallel to the variator axis 5 and will be referred to as the tilt axis. Preferably the bearings 15 permit freedom of movement of member 8 in the direction of axis 16. This, combined with limited freedom for the roller 6 to move along axis 5, will help to ensure proper contact between roller and discs even if there are errors of manufacture or assembly, or distortion during operation. Hydraulic cylinders 18 are formed in member 8 and connected by conduit 19 to a pump 20 and drain 21 by way of valves 22 controlled by the central electronic control system 23 of the CVT. Item 23 receives inputs indicative of all the parameters appropriate to the vehicle or other driveline of which the CVT is part, including driver demand from a pedal control indicated at 24.

Cylinders 18 contain pistons 27 formed with central bores 28. By way of round-ended sleeves 29, the pistons bear upon a disc 30 formed with a lug 31 carrying an axle 32 mounted to rotate within bearings 15. A cylindrical casing 34 is mounted to move relative to the disc 30, in the manner of a cylinder over a piston. Roller 6 is supported axially by a thrust race 35 separating it from casing 34. A rotary bearing 36, and a spigot 37 which carries a sealing ring 40 and is integral with disc 30, keep the roller 6 in alignment within disc 30. The central bores 28 within pistons 27 communicate, by way of corresponding bores within sleeves 29, with a conduit 42 formed within disc 30 and thence, by way of a one-way valve 43, with a cavity 44 between disc 30 and casing 34. Valve 43 acts so as to pass, to cavity 44, the higher of the two hydraulic pressures existing at any time in the left-hand and right-hand cylinders 28. The round ends of sleeves 29 accommodate any misalignment between items 27 and 30 whenever there is tilt about axis 16.

As already described, carriage member 8 is constrained by the fixed structure 12 so that it can only rotate about the precession axis 10, and the necessary "end load" to maintain appropriate traction-transmitting contact between races 3 and 4 and the rim of roller 6 is generated by the hydraulic pressure in cavity 44 in which a pre-load, to ensure that a minimum force separates disc 30 and cylinder 34 even when the CVT is first energised, may conveniently be provided by springs 45. The dimensions of items 30 and 34, the power of pump 20 and the programming of control system 23 must be chosen to generate hydraulic pressures appropriate for the end loads required.

Because the roller 6 is substantially offset from the centre 46 (FIG. 1) of the torus presented by races 3 and 4, the traction forces on the roller will create a tilting moment about the centre. Provided that centre lies reasonably close to the tilt axis 16 (as shown, the two actually coincide), a hydraulically-generated counter moment can control the traction force, which is proportional to the sum of the input and output torques on the variator. Then the "ideal" normal forces between the roller 6 and discs 2, 3 can be applied by using the same hydraulic control pressure to the rollers along their axes of rotation. The resultant of the pressures in cylinders 18 creates a tilting moment about axis 16 and tilting movement, resulting in the rollers steering to a new ratio and a new equilibrium, occurs if there is an imbalance between this moment and that arising from the traction forces. The tilt angle (about axis 16) is thus determined by the algebraic sum of the tilting and traction force moments. The geometry of the variator dictates a rotation about precession axis 10 until an equilibrium condition is reached in which the loads in cylinder cavities 18 and 44 are appropriate to the demanded traction forces, and at such an equilibrium condition the tilt angle about axis 16 correlates with a unique precession angle about axis 10. As has already been explained in the introduction, this is in contrast to the behaviour of the construction described in the drawings of U.S. Pat. No. 3,008,337, where no castor angle is present, where any equilibrium ratio angle position of the rollers (20) can only coincide with their mid-position relative to the "tilt axis" (defined by rib 70), and any departure from that mid position can only accompany a transition of the roller from one equilibrium ratio angle to another.

The bearings 36 transfer the traction forces from the roller 6 to the carriage member 8, and the thrust bearing 35 conveys the hydraulic "end load" from the casing 34 to the roller. It should also be noted that while it would be possible according to the invention to generate the end load between rollers and discs differently—for instance by applying that load directly and axially to the discs rather than to the rollers, or by applying it to the rollers in a different manner—it is preferred, as illustrated, to exert it inwardly upon the rollers as shown. It is convenient to generate the load in the cavity 44, located between the roller and the bearings (13) where it pivots about the precession axis 10. This contrasts with previous proposals such as U.S. Pat. No. 4,484,487 where in the absence of castor angle the reaction of a hydraulically-generated inward end load is taken by the fixed structure of the variator.

We claim:

1. A half toroidal race rolling traction variator for a continuously-variable-transmission, the variator having:

(a) a pair of discs (1,2) being mounted for rotation about a variator axis (5);

(b) a roller (6) being positioned between said discs for transmitting traction therebetween;

(c) a carrier (30) in which said roller (6) is mounted for rotation about a roller axis (7) and for tilting about a tilt axis (16); and (d) a support member (8) in which said carrier is carried;

wherein said support member (8) is, in turn, mounted for rotation about a precession axis (10) inclined at an angle (c) to a plane (11) lying normal to said variator axis (5), such that a ratio change results when said support member (8) exercises a freedom of movement by rotating about said precession axis (10) and in which an equilibrium condition is reached when each angle of tilt about said tilt axis (16) correlates with an associated unique angle of rotation about said precession axis (10).

2. A variator according to claim 1, wherein the discs (1,2) rotate about coaxial and substantially fixed centers and a necessary end load to urge the roller (6) into traction-transmitting contact with the discs (1,2) is exerted upon the roller (6) in a direction aligned with the roller axis (7).

3. A variator according to claim 2, wherein the end load is generated hydraulically by piston-and-cylinder means (30,34) which rotate about the precession axis (7) with the roller (6).

4. A variator according to claim 3, wherein rotation of the roller (6) about the tilt axis (16) is responsive to a hydraulically-generated control force, and in which the magnitude of the end load is a function of the magnitude of that force.

5. A variator according to claim 4, wherein the orientation of the roller about the tilt axis is determined by the algebraic sum of the moment generated by the control force and the moment generated by the traction force on the roller.

* * * * *